United States Patent [19]
Flynn

[11] 4,183,501
[45] Jan. 15, 1980

[54] CONTROL VALVE

[75] Inventor: Eugene R. Flynn, Farmington Hills, Mich.

[73] Assignee: Manville Manufacturing Corporation, Pontiac, Mich.

[21] Appl. No.: 809,672

[22] Filed: Jun. 24, 1977

[51] Int. Cl.² ............................................. F16K 1/34
[52] U.S. Cl. ................................. 251/357; 251/215; 251/360; 137/606; 251/368
[58] Field of Search ........................ 4/191, 192, 195; 137/606; 251/360, 357, 368, 215

[56] References Cited

U.S. PATENT DOCUMENTS

| D. 189,179 | 11/1960 | Manville | D23/25 |
|---|---|---|---|
| 1,517,380 | 12/1924 | Oleson | 251/360 |
| 2,704,650 | 3/1955 | Rand | 251/357 |
| 2,710,020 | 6/1955 | Manville | 251/333 |
| 2,893,687 | 7/1959 | Huthsing | 251/357 |
| 2,952,439 | 9/1960 | Koons | 251/357 |
| 3,199,833 | 8/1965 | Skinner | 251/357 |
| 3,434,694 | 3/1969 | Skinner | 251/215 |
| 3,481,367 | 12/1969 | Deuschle | 251/368 |
| 3,552,714 | 1/1971 | Manville | 251/88 |
| 3,656,711 | 4/1972 | Toelke | 251/368 |
| 3,857,546 | 12/1974 | Quirk | 251/368 |

FOREIGN PATENT DOCUMENTS

| 2102402 | 1/1970 | Fed. Rep. of Germany | 137/606 |
|---|---|---|---|
| 503938 | 4/1939 | United Kingdom | 4/192 |
| 1317300 | 5/1973 | United Kingdom | 251/357 |

Primary Examiner—William R. Cline
Assistant Examiner—H. Jay Spiegel
Attorney, Agent, or Firm—Woodard, Weikart, Emhardt & Naughton

[57] ABSTRACT

A fluid control valve includes a valve body having a passageway, a valve stem, a valve seat, a floating stem end member and a captive internally threaded insert. The valve stem has a molded-on, color-coded external thread mating with the internal thread of the color-coded insert so as to advance or retract the stem through the valve body as the stem is turned by an operating knob. The stem end member includes a pair of retaining arms which snap over a shoulder on the stem and these arms are confined within the valve body. These arms retain the stem end member on the stem while still permitting free rotation of the stem within the stem end member. As the stem advances into the valve body, the stem end member is moved into sealing contact with the valve seat, thereby blocking the continued passage of water from an inlet port to an outlet port. The valve seat also serves as a union nut mount, and is slotted for easy removal from the rear by use of a screwdriver for servicing.

1 Claim, 11 Drawing Figures

CONTROL VALVE

BACKGROUND OF THE INVENTION

1. Field of the Invention

This invention relates in general to valve assemblies and in particular to control valves for water.

2. Description of the Prior Art

There are various valve designs which attempt to provide for the control of fluid from an inlet point to an outlet point in good-sealing, long-wearing, reliable and low-cost manner. Unfortunately, features best achieving certain of these advantages are not always compatible with one another. Often, one desirable feature must be compromised in order to use a different advantageous feature. Some examples of efforts to achieve some of the above advantages are disclosed by the following patents:

| Patent No. | Patentee | Issue Date |
|---|---|---|
| 2,704,650 | Rand | 3/22/55 |
| 2,893,687 | Huthsing | 7/07/59 |
| 2,952,439 | Koons | 9/13/60 |
| 3,199,833 | Skinner | 8/10/65 |

These prior art efforts did not result in the creation of a device possessing all the above-mentioned advantages. The device of Manville, U.S. Pat. No. 3,552,714, issued on Jan. 5, 1971 and assigned to the assignee of the present application, was the result of a successful effort to achieve the aforementioned advantages.

Although these prior art devices focus primarily on the design of a valve seal and valve seat, the typical valve construction in which such seals and seats are used further include a valve body and a stem threadedly received by the body. The valve seal member is normally attached to the end of the stem in such a manner that as the stem is advanced into the valve body the seal is advanced into sealing engagement with the valve seat. Some such valves, as shown by the Manville patent, include a valve seat member which has a hexagonally-shaped recess aperture in order to permit removal of the valve seat member by use of an allen wrench when the knob and stem portions of the valve assembly are removed. The Manville device also includes the feature of retaining the valve seal on the end of the stem by using a retaining ring which is received in a groove on the valve stem and fits snugly in the valve seal member.

Inherent with any valve device is the fact that as more machining is required to be performed on the component pieces, such as internal and external threads and retaining ring grooves, the associated cost of the valve assembly increases. In addition, these prior art devices which rely on the hexagonally-shaped aperture as the means by which the valve seat can be removed, have the disadvantage that if the valve seat is tightly threaded in place, sufficient loosening torque may not be able to be developed through the allen wrench before the hexagonal aperture is stripped (rounded). In the event the aperture is stripped, the removal of the seat may be virtually impossible without the complete disassembly of the entire valve assembly.

SUMMARY OF THE INVENTION

One embodiment of the present invention comprises a valve body, a valve stem, a stem end member, an insert and a valve seat. The valve body has a passageway therethrough and the valve stem has a shoulder around its periphery. The stem end member which is received on one end of the stem and is rotatable with respect thereto includes retaining arms which are snapped over the shoulder on the stem and are confined by the valve body. The insert is positioned in the valve body for threaded reception of the stem and guidance of longitudinal movement of the stem through the valve body. The valve stem is adjacent to the stem end member and the stem end member is movable toward the valve seat in response to advancing rotation of the stem. The seat is removable from the rear, and serves as a union nut mount. Stem threads and inserts are color-coded.

One object of the present invention is to provide an improved control valve.

Another object of the present invention is to provide a lower-cost control valve.

Related objects and advantages will be apparent from the following description.

DESCRIPTION OF THE PREFERRED EMBODIMENT

Figure 1:
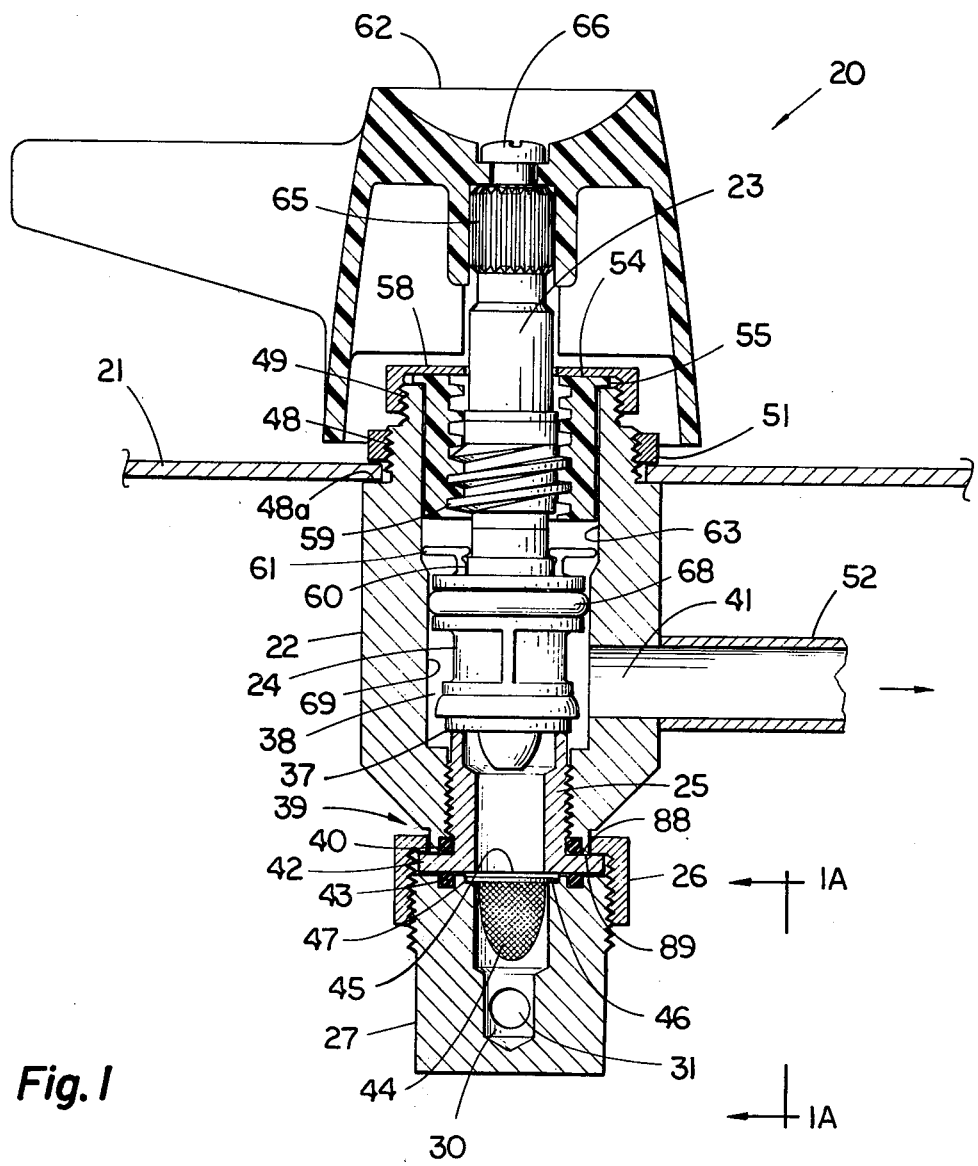
FIG. 1 is a sectional view of a valve assembly according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1A:
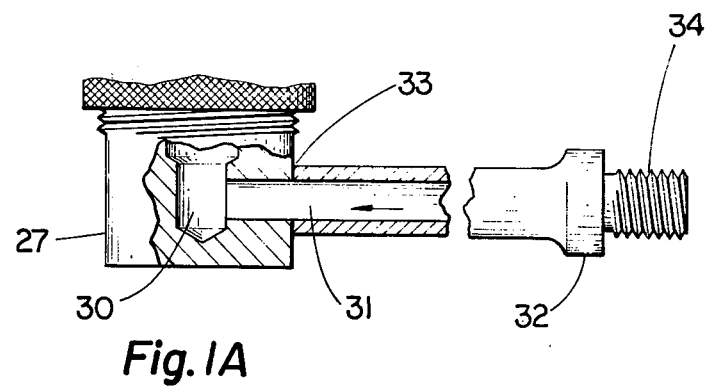
FIG. 1A is a fragmentary sectional view at line 1A—1A in FIG. 1 and showing a typical water inlet fitting connection to the control valve.

Referring to FIG. 1, valve assembly 20 is oriented as it would be when employed in an assembly such as shown in Manville U.S. Pat. No. 2,710,020 issued June 7, 1955 and U.S. Pat. No. Des. 189,179 issued Nov. 1, 1960. It is located primarily behind a panel 21, and comprises a valve body 22, valve stem 23, stem end member 24 and valve seat 25. Also shown are union nut 26 and inlet fitting 27 which are required for connection of valve assembly 20 to a source of fluid, such as water. As shown in additional detail by FIG. 1A, inlet fitting 27 is a generally cylindrical, externally threaded member which has an inlet passageway 30 joined to an inlet port 31 to which a connecting pipe 32 is rigidly joined and sealed at surface 33. The free end 34 of pipe 32 is suitably adapted, for example, with external threads to mate with other plumbing fixtures such as pipes delivering hot and cold water.

Valve seat 25 is threadedly received by one end of valve body 22 and valve seat surface 37 protrudes upwardly into the open passageway 38 central to valve body 22. The shape of valve body 22 and valve seat 25 are such that when valve seat 25 is threaded into valve body 22, annular groove 39 is generated between the lower end 89 of valve body 22 and the circular flange 42 on valve seat 25. This occurs when the face 88 of the flange 42 abuts the lower end 89 of the valve body.

Flange 95 of union nut 26 (FIG. 6) is received on flange 42 of the valve seat 25 so that, when the seat is installed in the valve body, the nut 26 is loosely retained in the annular groove 39. Nut 26 can then threadedly receive inlet fitting 27 such that, as the nut is tightened, the inlet fitting 27 and the flange 42 of the valve seat 25 are drawn toward one another in a clamped-together arrangement controlled by union nut 26. The fitting 27 is sealed to valve seat 25 by "O-ring" 43 received in a groove in the face of fitting 27. O-ring 40 seals valve seat 25 to valve body 22. Thus, water entering pipe 32 passes through inlet port 31 and through inlet passageway 30, and then through valve seat 25, past the stem end member 24 (when unseated), into passageway 38 and exits at outlet port 41 which is approximately midway up valve body 22. Outlet pipe 52 is rigidly secured around the outlet port 41 of valve body 22, typically by brazing. A screen 44 is positioned within inlet passageway 30 of inlet fitting 27 in order to retain foreign matter which might be within the entering fluid. The larger diameter end 45 of the screen 44 includes a lip 46 received in groove 47. Valve body 22 includes a reduced-diameter threaded neck portion 48 which extends through an opening in panel 21 and receives a knurled internally threaded retaining ring 51 whereby the panel 21 is clamped against shoulder 48a of the valve body. A second, reduced-diameter, externally threaded neck portion 49 receives in bore 63 thereof a molded plastic, internally threaded insert 54 which has a radially extending circular flange 55 at one end. Flange 55 rests against the end of the neck portion 49 and is clamped against the end by means of a knurled, internally threaded retainer bushing nut 58. Insert 54 is molded from a suitable glass-filled, color-impregnated, silicone-impregnated plastic material such that the required internal threads as molded are of suitable tolerance and finished without the necessity of machining.

Valve stem 23 extends through the retainer bushing nut 58 and into the passageway 38. An appropriate knob 62 is mounted at one end of the valve stem. A knurled, splined, or otherwise shaped surface 65, is provided on the stem to mate with the knob and to prevent relative rotation therebetween. A suitable screw 66 received in threads 79 (FIG. 2A) secures the knob to the stem. Stem end member 24 is located at the opposite end of the stem. A flight of external threads 59, sized and positioned to threadedly mate with the internal threads of insert 54, is molded on the valve stem 23.

Figure 2A:
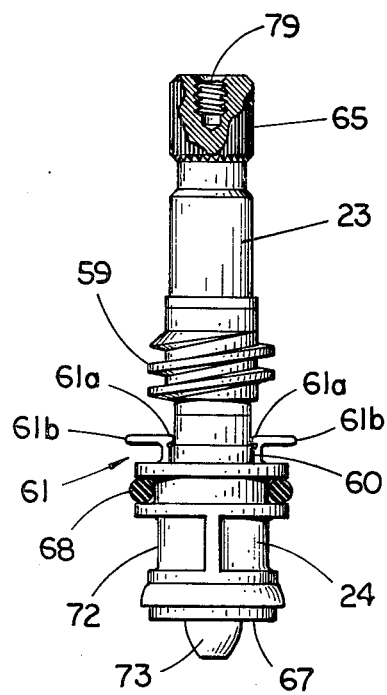
FIG. 2A is a view of a stem and a seal end member comprising a portion of the FIG. 1 valve assembly.

Stem 23 has an annular shoulder 60 which is positioned slightly above the stem end member 24 when the member is retained on stem 23 (see FIG. 2A). A pair of latching arms 61 which comprise a portion of stem end member 24 extend upwardly therefrom. These arms have inwardly projecting latching fingers 61a which snap over the stem shoulder 60, thereby retaining stem end member 24 onto the end of valve stem 23. The arms have guiding and confining fingers 61b having an outside diameter of about two to six thousandths of an inch less than the outside diameter of the bore 63 of the valve body. Since the overlap of the stem shoulder 60 by the latching fingers 61a is a total of about forty-four thousandths of an inch, the stem end member cannot become separated from the stem while the guide ears 61b are in bore 63.

The stem end member further comprises an O-ring 68 which is received in a groove on the stem end member and a bib washer 67 at the lower end of the stem end member. The bib washer 67 is disposed to engage and seal on the valve seat surface 37 as valve stem 23 moved toward the valve seat during rotation of the stem by operation of knob 62. At the same time, the O-ring sealingly engages and moves along the inner surface 69 of valve body 22 to prevent any leakage of water up along the stem. The design of stem end member 24 and valve stem 23 is such that stem end member 24 is able to remain stationary relative to rotation of stem 23, which permits the bib washer 67 to seat against the valve seat surface 37 without any friction wear between these members.

Figure 2B:
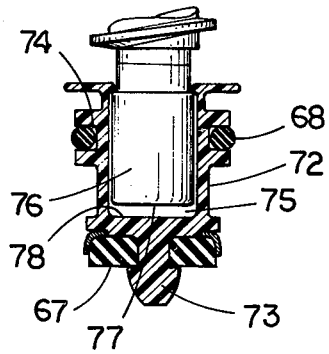
FIG. 2B is a section through the combination of the stem and stem end member.

Referring to FIGS. 2A and 2B, the stem end member 24 is preferably a single piece, glass-filled, silicone-impregnated, molded acetal such as "Delrin" or "Celcon" acetal. The main body portion 72 includes groove 74 receiving O-ring 68, and protuberance 7 provides a cylindrical member with an enlarged head over which the bib washer 67 is snapped and thereby retained. The inner surface of portion 72 includes a cylindrical bore 75 into which end portion 76 of stem 23 is inserted. Since bore 75 is a blind hole, the stem end 77 can bear on the bottom 78 of the hole when the valve stem is being turned in a valve closing direction, to drive the stem end member, and thereby the bib washer, against the valve seat surface 37 of the valve seat 25. As shown, there is sufficient clearance between the stem end member 24 and the valve stem 23 such that end member 24 and stem 23 are free to rotate independently of one another, while end member 24 is retained on stem 23 by means of arms 61 as previously described.

When the bib washer 67 on the stem end member 24 needs to be replaced or when the entire end member is to be replaced, the end member 24 is snapped off stem 23 by spreading arms 61 so that these arms do not surround shoulder 63. Then the end member can be slipped off the stem. Bib washer 67 is easily replaceable by merely pulling it off of protuberance 73 and then snapping a new washer on.

Figure 3:
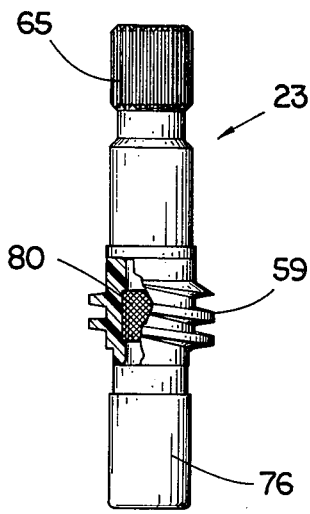
FIG. 3 is a view of the stem with a portion in section to show internal features.

External threads 59 which are molded onto stem 23 have been mentioned previously. In order to assure that threads 59 remain rigidly secured to stem 23 as they are molded in place, relief is provided over which the threads 59 are molded. Such relief is shown in FIG. 3 wherein the central cylindrical portion of stem 23 is reduced in diameter and comprises a knurled portion 80. This knurled portion provides sufficient surface deformations into which the molding compound locks as the threads 59 are molded around stem 23. Once the molding compound cures, the resultant threads 59 are rigidly secured to stem 23 and incapable of slipping or turning relative to the stem when the stem is rotated by means of knob 62. The preferred compound for molding threads 59 onto stem member 23 is a glass-filled, silicone-impregnated, colored acetal material.

Figure 4:
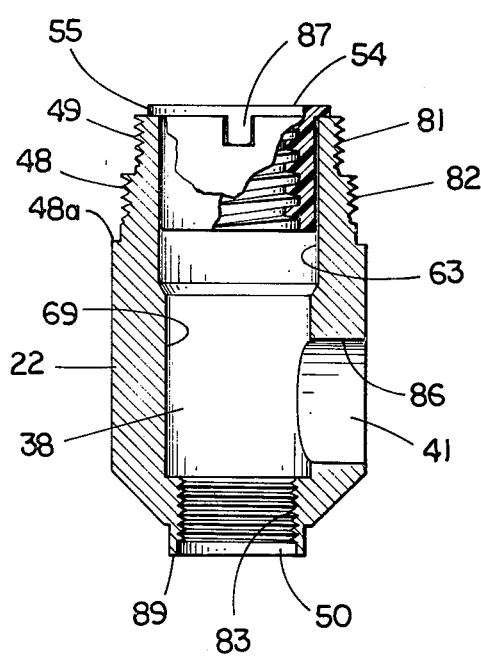
FIG. 4 is a sectional view of a valve body and insert comprising a portion of the FIG. 1 valve assembly.

FIG. 4 is a sectional view of the valve body 22 including insert 54. This insert is made of the same material as member 24. As shown, insert 54 rests atop one end of valve body 22 and is readily removable therefrom when retainer 58 (FIG. 1) is not attached by means of threads 81. External threads 82 on neck portion 48 mate with the internal threads of knurled ring 51 in order to attach the valve body 22 to a member such as panel 21 (see FIG. 1). Internal threads 83 mate with the external threads of valve seat 25 as shown in FIG. 1. The position of outlet port 41 is such that when stem 23 and stem end member 24 are inserted within the valve body 22 the O-ring 68 retained by main body portion 69 remains above the top edge 86 of outlet port 41 when bib washer 67 is in contact with valve seat surface 37. In this configuration, valve end member 24 prevents any incoming water from entering the upper portion of valve body 22 due to the sealing engagement of O-ring 68 against bore 69 of valve body 22.

Included as part of flange 55 of insert 54, are a pair of lugs 87, one of which is shown in FIG. 4. The second lug 87 is positioned 180° from the lug which is shown. These lugs fit within correspondingly-sized recesses in valve body 22 on the inner surface opposite threads 81. The mating of lugs 87 with the recesses permits insert 54 to be positioned and will not allow insert 54 to be turned or to rotate as the remainder of the valve assembly is assembled or disassembled, or as the stem is turned by knob 62.

Figure 5:
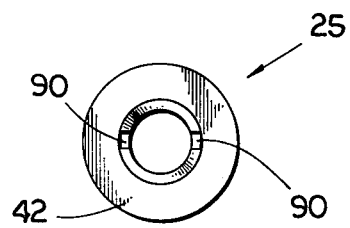
FIGS. 5 and 5A are an end view and side view respectively of a valve seat comprising a portion of the FIG. 1 valve assembly.
Figure 5A:
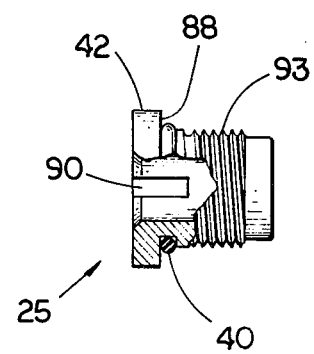

FIGS. 5 and 5A are an end view and side view, respectively, of valve seat 25. The underside 88 of flange 42 comprises one side of annular groove 39 (see FIG. 1) into which nut 26 is placed for a clamping action whereby valve seat 25 and inlet fitting 27 are drawn into contact with one another as nut 26 is tightened onto the external threads of inlet fitting 27. A pair of spaced channels or slots 90 are positioned 180° apart and extend longitudinally into the body of valve seat 25. These channels 90 are provided so that valve seat 25 may be removed from the rear of valve assembly 20 once inlet fitting 27 has been separated from valve seat 25. The use of channels 90 permits a flat-bladed screwdriver to be used as the appropriate tool for manual disassembly of valve seat 25 which may be required if the valve seat 25 is defective and a replacement seat is required to be installed. The ability to remove valve seat 25 from the rear of valve assembly 20 is an improvement inasmuch as there is no longer the requirement of having to completely disassemble the front portion of the valve assembly in order to remove the valve seat. Nor is there any longer the requirement that the valve seat 25 be removed by means of an allen wrench. O-ring 40 is located in a suitably-sized O-ring groove between external threads 93 and the face 88 of flange 42. The position and arrangement of valve seat 25 and its mating into valve body 22 as well as the position of O-ring 40 are shown in FIG. 1. The O-ring seats in a counterbore 50 which opens at the end 89 of the valve body (FIG. 4). The edge of the counterbore at the end 89 is "broken" (rounded with a 0.005 inch radius) to avoid cutting the O-ring during assembly of the valve seat to the valve body.

Figure 6:
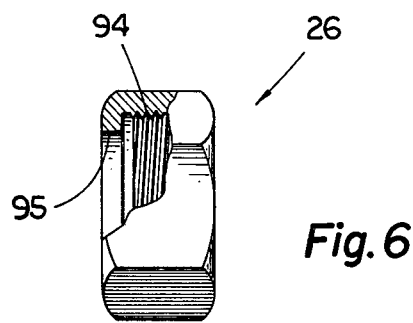
FIG. 6 is a side view of a union nut comprising a portion of the FIG. 1 valve assembly with a portion broken out to show the interior.

FIG. 6 is a side view of nut 26 which is generally hexagonally shaped in exterior contour, internally threaded, and has a reduced internal diameter end portion. Internal threads 94 mate with the external threads of inlet fitting 27, while flange 95 fits within annular groove 39 and around valve seat flange 42 to secure the valve seat 25 to inlet fitting 27 as discussed above.

Figure 7:
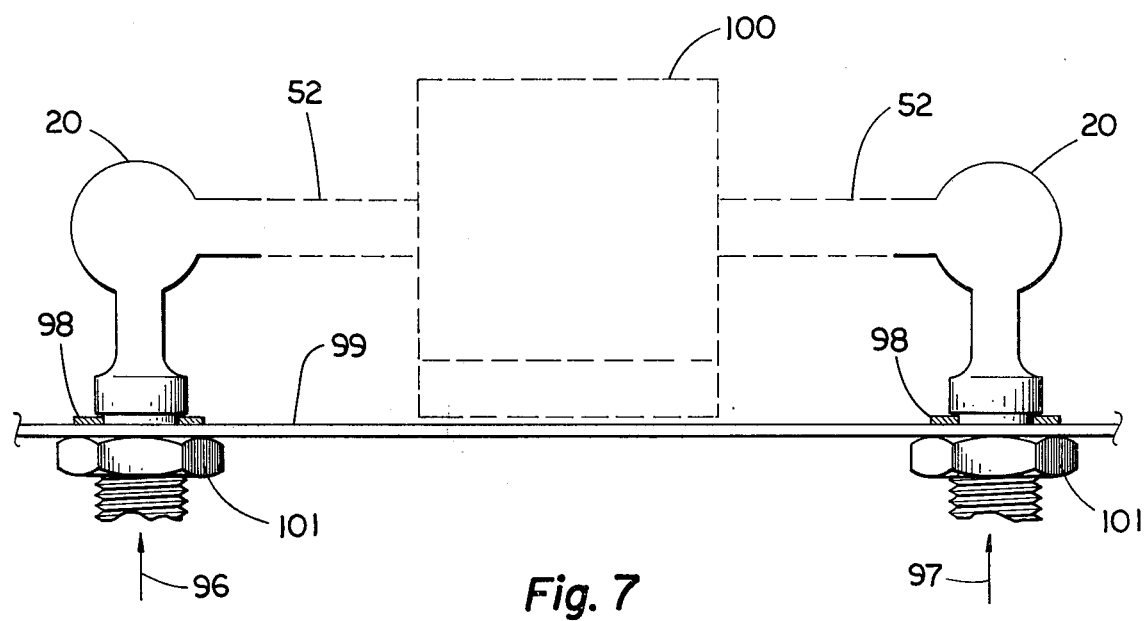
FIG. 7 is a symbolic front view of one arrangement for utilization of the FIG. 1 valve assembly.

FIG. 7 is a symbolic front view showing one possible arrangement employing a pair of valve assemblies 20. It is contemplated that a pair of valve assemblies 20 could be secured to a surface 99 by means of retaining rings 98 and nuts 101. Connecting outlet pipes 52 would be capable of delivering hot water (designated by arrow 96) and cold water (designated by arrow 97) to a single point of distribution 100 by means of operation of the respective valve 20. Typical of such an arrangement would be a knob and faucet configuration similar to those illustrated in the above-mentioned Manville U.S. Pat. Nos. 2,710,020 and Des. 189,179. In this arrangement, the plumbing beneath the sink or from within the wall will provide suitably-sized and positioned pipes for the delivery of hot and cold water such that connecting inlet pipes 32 of valve assemblies 20 can be attached to these incoming water pipes. Once mounted to surface 99 and connected to the hot and cold water pipes, each valve assembly 20 will be operable, by means of turning the respective knob 62, to deliver an amount of hot or cold water, the amount depending upon the degree of rotation of valve stem 23 of either the hot or cold water valve assembly. Point of distribution 100 is contemplated to comprise a single outlet faucet which receives the incoming hot and cold water through connecting pipes 52 and blends the amounts of hot and cold water together and delivers this blended water out of the end of the faucet. From a fully closed position, the hot water valve will deliver water in response to a counterclockwise turning of knob 62, while the cold water valve will deliver water in response to clockwise rotation. Although FIG. 7 shows an arrangement in which the incoming hot and cold water pipes are in a vertical position, a similar arrangement can be employed for pipes which exit in a horizontal plane from the wall. If horizontal hot and cold water pipes are present, the inlet fitting 27 which adapts the valve assembly 20 to the inlet pipe will be changed from a right-angle fitting (see FIG. 1) to a straight fitting. The orientation of FIG. 7 is such that the arrangement is viewed from the front and, in keeping with plumbing conventions, the hot water tap is on the left and the cold water tap is on the right. In the event the arrangement (including valve assemblies 20, pipes 52 and point of distribution 100) is enclosed by a cover or housing which would be the normal condition, this housing must be removed in order to have access to disassemble valve assembly 20 from the inlet pipe. If the valve seat 25 is to be replaced, the housing must be removed so that there can be access to nut 26.

Figure 8:
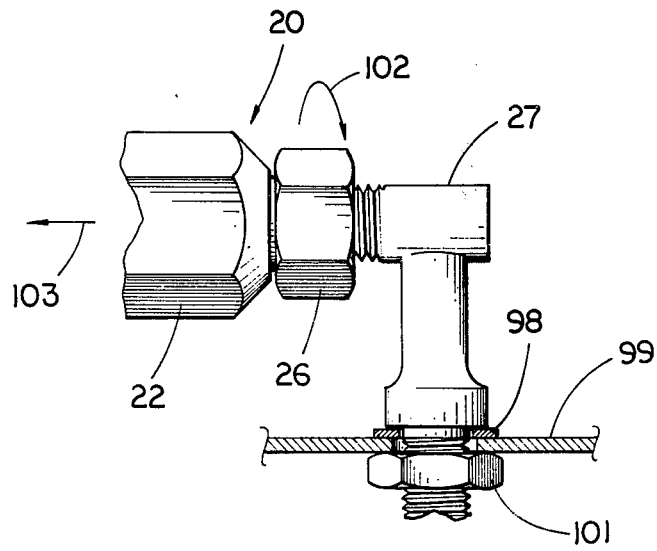
FIG. 8 is a partial side view of one mounting arrangement of the FIG. 1 valve assembly to an inlet fitting when used as in FIG. 7, for example.

Referring to FIG. 8, there is shown a partial side view of valve body 22 joined to inlet fitting 27 by means of nut 26. With any housing removed so that there is access to nut 26, turning nut 26 in a clockwise direction, as viewed from the rear and designated by arrow 102, will force valve body 22 forward in the direction of arrow 103. Continued turning of nut 26, will separate nut 26 from fitting 27. Once each nut 26 is apart from each fitting 27, (assuming a hot and cold water arrangement as in FIG. 7), the entire arrangement is removable from surface 99 such that the slotted recess 90 in each valve seat 25 is exposed and, by use of a flat-bladed screwdriver, the valve seats 25 are removable.

When the valve assemblies 20 are part of a larger system, such as the arrangement of FIG. 7, in which hot and cold water is delivered, color coding of some parts is advantageous. As previously mentioned, the hot water valve knob goes from closed to open positions with counterclockwise turning while the cold water valve does so with clockwise turning. Consequently the threads will have to be right-hand threads in one case and left-hand threads in the other. To simplify ordering of replacement parts, the molded insert 54 and the external threads 59 on stem 23 are colored red for hot water valves (counterclockwise) and for cold water valves, these molded portions are colored blue (clockwise). Colored dies can be used in these parts without worry about contact with the water being delivered, as it never contacts them. The valve stem end need not be and is not, color-coded.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a valve assembly, the combination comprising:
   a rotatable stem having a cylindrical end portion and a shoulder thereon separating said end portion from the remainder of said stem and facing in a direction opposite said end portion;
   a stem end member including a replaceable sealing portion engageable with a valve seat to block fluid flow through the seat;
   said stem end member having a blind hole receiving said stem end portion therein;
   said stem end member having retaining arms, said retaining arms having inwardly extending latching fingers normally disposed in abutting relationship on said shoulder to preclude removal of said stem end portion from said stem end member;
   said stem and said stem end member having colinear axes;
   said arms extending generally parallel to said axes, said latching fingers extending generally perpendicular to said axes, said arms being radially and resiliently expandable at the location of said latching fingers to permit intentional termination of said abutting relationship on said shoulder by removal of said fingers from said shoulder and subsequent removal of said stem from said member;
   said retaining arms further including radially outwardly extending guide fingers adjacent said latching fingers to preclude said resilient separation of said arms when said guide fingers are confined in a bore having an axis colinear with said stem axis.

* * * * *